July 30, 1968

C. R. FROHMBERG ET AL 3,394,597

SENSOR-TORQUER ARRANGEMENT

Filed July 7, 1965

CLIFFORD R. FROHMBERG
JEROME S. LIPMAN
BRUCE A. SAWYER
INVENTORS

BY Frederic P. Smith

ATTORNEY

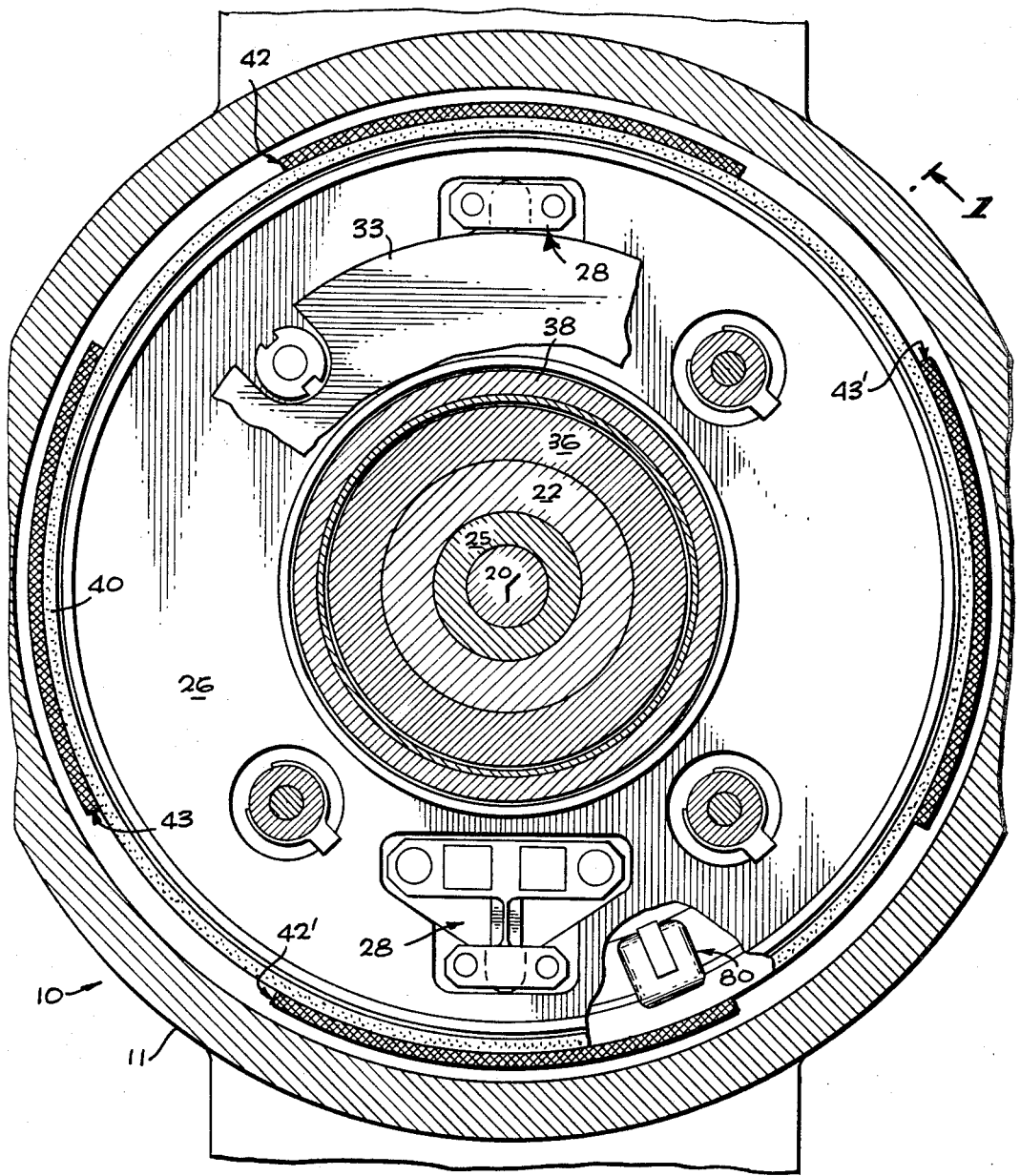

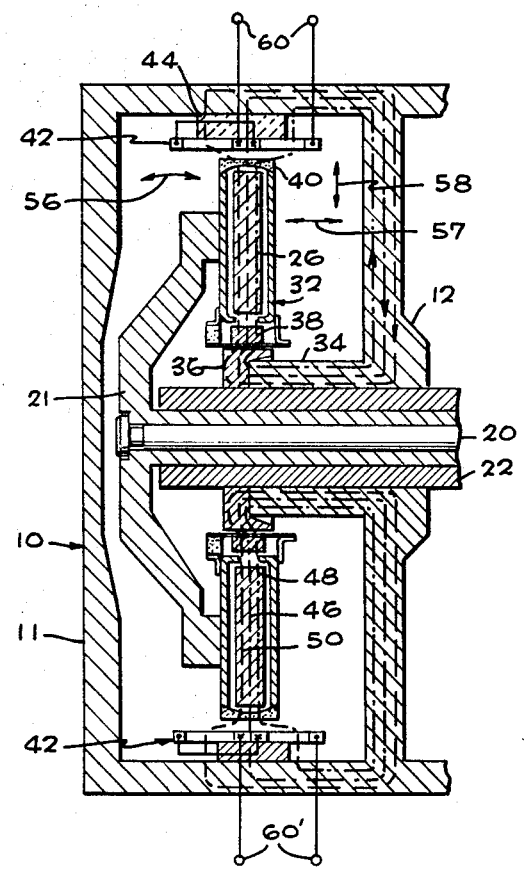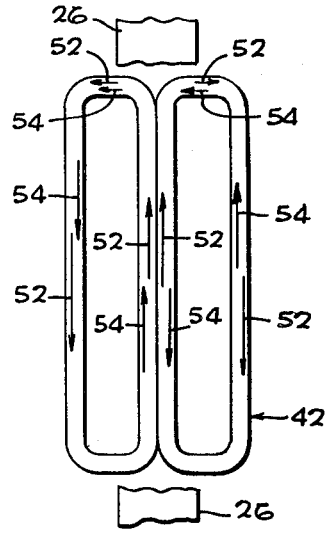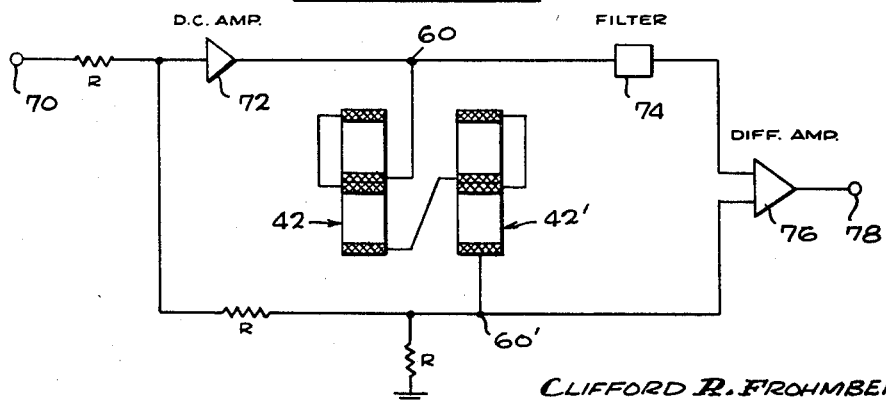

United States Patent Office 3,394,597
Patented July 30, 1968

3,394,597
SENSOR-TORQUER ARRANGEMENT
Clifford R. Frohmberg, Jerome S. Lipman, and Bruce A. Sawyer, Los Angeles, Calif., assignors to Litton Systems, Inc., Beverly Hills, Calif.
Filed July 7, 1965, Ser. No. 471,506
21 Claims. (Cl. 74—5.6)

ABSTRACT OF THE DISCLOSURE

A sensor arrangement for use with a vibrating inertial element in which a magnetic field is generated having a flux path extending radially through the inertial element and a sensor is positioned adjacent the outside periphery of the inertial element and coupled to the magnetic flux of the magnetic field.

---

The present invention relates in general to navigational and positional instruments and in particular to a improved sensor-torquer arrangement for a vibrating rotor gyroscope.

One form of vibrating rotor gyroscope, an inertial instrument possessing many advantages over conventional gyroscopes, is described in a co-pending application entitled "Vibra-Rotor Gyroscope" by H. F. Erdley, et al., Ser. No. 323,985, filed Nov. 15, 1963, and assigned to the same assignee as the present application. In general, the vibrating rotor gyroscope comprises an inertial element which is coaxially coupled to a rotating shaft. The inertial element rotates with the shaft and has torsionally restrained vibrational freedom about its mounting axis which is angularly disposed (ordinarily perpendicular) to the shaft. The vibrating rotor gyroscope is designed so that the natural frequency of vibration of the inertial element about the mounting axis is equal to the frequency of shaft rotation (N) in order to make the inertial element very sensitive to motions at right angles to the axis of the shaft. An external angular displacement of the vibrating rotor gyroscope around any axis, except the spin axis, causes the inertial element to vibrate at its natural frequency, the maximum amplitude of such vibration being proportional to the angular displacement. In addition, the phase of the vibration relative to a timing signal is a direct measure of the direction of angular displacement. Hence, the vibrating rotor gyroscope may be used in place of a direct reading, two-degree-of-freedom gyroscope. Furthermore, since the vibrating rotor gyroscope requires no complicated gimbal suspension system or floatation fluid, it has an extremely low drift rate and is far superior to conventional gyroscopes.

As explained in the above-cited application, the effective operation of a vibrating rotor gyroscope in a displacement mode of operations requires first that the time constant of the system be long, so as to ensure the linear proportionality of the maximum amplitude of vibration of the inertial element to the angular displacement of the vibrating rotor gyroscope, and second that the time of application of a particular angular displacement rate be very much less than the time constant of the system. It has been found that these requirements are best fulfilled by placing the inertial element in a controlled atmosphere in the micron pressure range and by providing torquing coils which are linear in their response to a torquing signal and are capable of applying very fast torquing rates to the inertial element so as to control the vibratory motion thereof. In order to take full advantage of the potential sensitivity of the vibrating rotor gyroscope, moreover, the inertial element should be made extremely thin and should have very little torsional restraint about its mounting axis. When the inertial element is constructed in this manner, however, it not only is sensitive to forces causing vibrations in its normal operational mode but also is sensitive to forces causing longitudinal and transverse oscillatory motions, i.e., parallel and perpendicular to the axis of the shaft; in addition, such oscillatory motions can be caused by slight eccentricities present in the inertial element itself and its bearing structure.

Because of the extremely sensitive nature of the vibrating rotor gyroscope and because of the difficulties involved in eliminating the slight eccentricities of the inertial element and the spurious modes of oscillation, it is desirable that the sensor arrangement of the vibrating rotor gyroscope be extremely sensitive to the normal operational vibrations of the inertial element and insensitive to all other types of oscillations. While many other types of sensor arrangements have been tried in the prior art devices, they have been found to be unsatisfactory. The piezoelectric arrangements, for example, have generally been found to have insufficient sensitivity and too much of a dampening effect on the vibrations of the inertial element. The capacitive arrangements, on the other hand, have been found to be susceptible to noise from stray electric and magnetic fields because of the high impedance thereof and to have insufficient accuracy and reproducibility over a long period of time because of dielectric changes (such as outgassing). While the inductive arrangements have been found to provide sufficient sensitivity and accuracy, nonetheless, none of the prior art arrangements have proved to be insensitive to the eccentricities and spurious oscillations recited above.

In addition, it is desirable to be able to use a gas spin bearing in the vibrating rotor gyroscope as its inherently smoother mode of operation and longer life eliminates a source of oscillation producing forces. In order to withstand high accelerational forces, however, the gas spin bearing requires one atmosphere of pressure and thus must be isolated from the inertial element. This isolation was accomplished in the prior art by a rotating housing surrounding the inertial element. The enclosure provided in the prior art, however, necessitated the inclusion of the sensor and torquer arrangements inside the rotating housing and thus subjected the vibrating rotor gyroscope to possible coil outgassing and instabilities. In addition, the arrangement required the use of a torque resolver and a rotating transformer and did not allow the use of a sensor-torquer arrangement fixed in the outer case of the gyroscope.

The present invention has succeeded in overcoming all of the above-mentioned disadvantages of the prior art devices by providing a vibrating rotor gyroscope in which the sensor-torquer arrangement includes a permanent magnet having a flux path extending radially outwards through the inertial element and one or more pairs of series-connected sensor-torquer coils positioned in the magnetic flux path in close proximity to the inertial element. In addition, the inertial element is enclosed in a hermetically sealed rotating housing having the sides thereof at the same magnetic potential as the inertial element and the portion thereof lying in the magnetic flux path composed of a non-conducting, non-magnetic material.

It is therefore the primary object of the present invention to provide a new and improved sensor-torquer arrangement for a vibrating rotor gyroscope.

It is another object of the present invention to provide a new and improved sensor for a vibrating rotor gyroscope which is insensitive to transverse motions of the inertial element therein.

It is a further object of the present invention to provide a new and improved sensing ararngement for a vibrating rotor gyroscope which is insensitive to translational movements of the inertial element therein.

It is still another object of the present invention to provide a vibrating rotor gyroscope in which the inertial element is an integral part of the sensing system.

It is an additional object of the present invention to provide a vibrating rotor gyroscope having a sensor-torquer arrangement including a permanent magnet whose flux path extends radially through the inertial element.

It is a further object of the present invention to provide a vibrating rotor gyroscope in which the inertial element is enclosed in a rotating housing having a portion thereof composed of a non-conducting, non-magnetic material.

It is a further object of the present invention to provide a vibrating rotor gyroscope in which the inertial element is enclosed in a rotating housing whose sides are at the same magnetic potential as the inertial element.

The novel features which are believed to be characteristic of the invention, both as to its organization and method of operation, together with further objects and advantages thereof, will be better understood from the following description considered in connection with the accompanying drawings. It is to be expressly understood, however, that the drawings are for purposes of illustration and description only and are not intended as a definition of the limits of the invention.

FIGURE 2 is a cross-sectional view of a preferred embodiment of the present invention taken essentially along line 2—2 of FIGURE 1;

FIGURE 3 is a greatly simplified, plan view of the present invention illustrating the magnetic flux paths therein;

FIGURE 4 is a simplified view of the sensor elements of the present invention illustrating the voltages induced therein by the motions of the inertial element; and FIGURE 4a is a block schematic diagram of circuitry used for the sensor-torquer arrangement.

Figure 1:
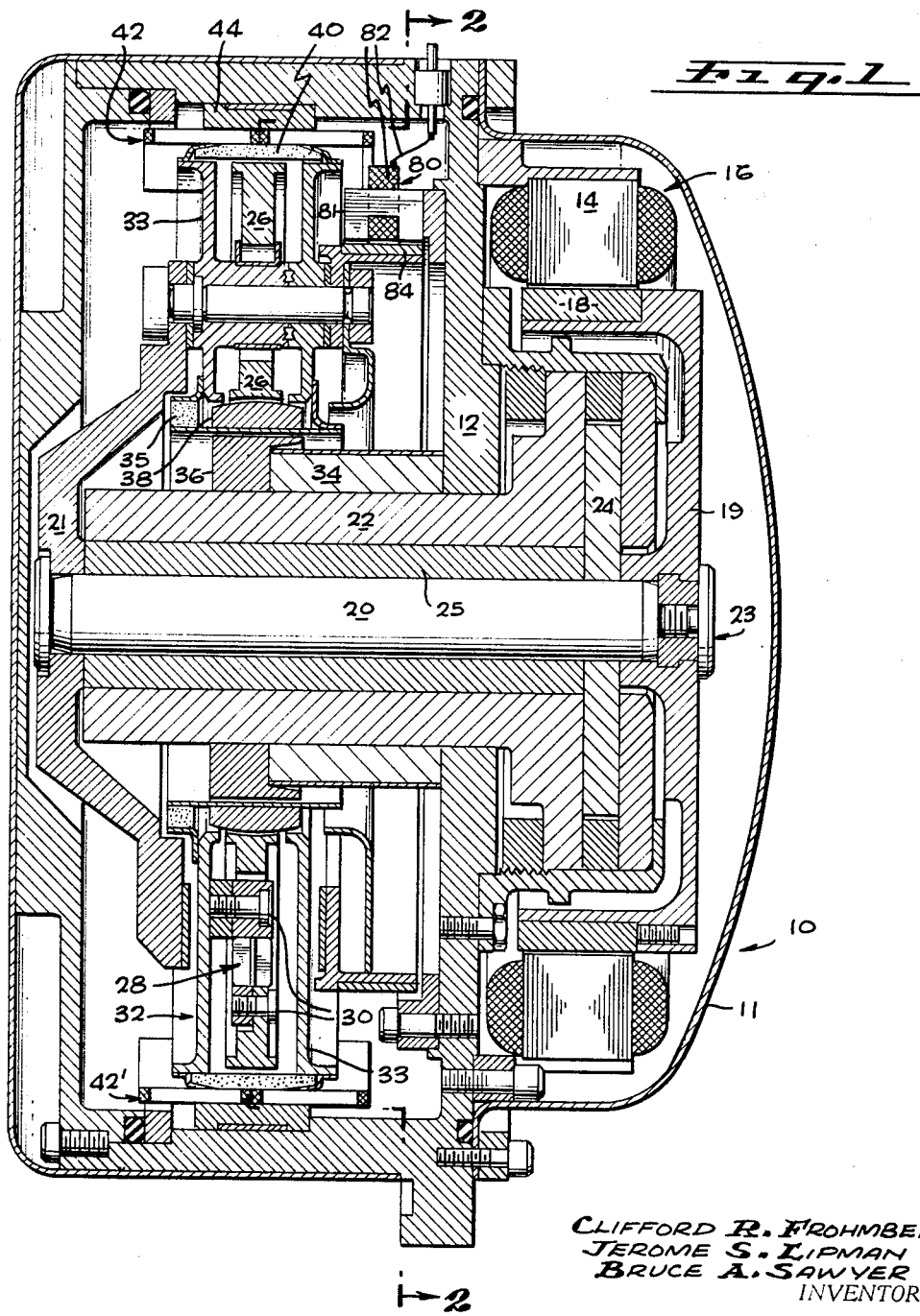
FIGURE 1 is a cross-sectional view of a preferred embodiment of the present invention taken on line 1—1 of FIGURE 2.

In FIGURES 1 and 2, a vibrating rotor gyroscope 10 is illustrated comprising a cylindrical outer casing 11 and a support member 12 attached thereto upon which is positioned the stator 14 of a constant speed synchronous hysteresis motor 16. The rotor element 18 of the synchronous motor 16 is affixed by means of member 19 and retaining pin 23 to a spin shaft or journal 20 which has a two-way thrust pad 24 attached thereto to bear axial loads and which is driven along with sleeve 25 by the rotor element 18 to rotate on a gas spin bearing 22, the bearing 22 being supported by the support member 12. The outer case 11 is generally constructed of a high permeability material such as iron-nickel alloy (for shielding purposes), while the journal 20 is constructed of a rigid material such as stainless steel. The inertial element 26 (shown here in the form of a ring) of the vibrating rotor gyroscope 10 is coupled the journal 20 by means of an umbrella-like member 21, a pair of cruciform-shaped torsion bars 28 and a pair of supports 30. One end of the supports 30 is attached to the inertial element 26 while the other end is attached to a rotating housing 32 which completely surrounds the inertial element 26. The rotating housing 32 is, in general, hermetically sealed and in the preferred embodiment is completely evacuated or alternatively contains a controlled low density atmosphere as of hydrogen or helium.

The novel sensor-torquer arrangement of the present invention can best be illustrated with reference to FIGURES 3 and 4 along with FIGURES 1 and 2. A permanent magnet 34 is mounted on the stationary bearing 22 and has a pole cap 36 attached thereto to direct the magnetic flux from the permanent magnet 34 to the edge of the rotating housing 32. The magnetic flux is coupled through the rotating housing 32 to the inertial element 26 by means of a ferrite ring 38, the ferrite ring 38 acting to prevent any eddy currents which would ordinarily arise from the vibrations of the inertial element 26 with respect to the pole cap 36. Both the inertial element 26 and the pole cap 36 are composed of a magnetic material such as 50% Ni–50% Fe. The magnetic flux then extends radially outwards through the inertial element 26 and the outer portion 40 of the rotating housing 32. In order that the energy loss due to vibrationally induced damping be minimized so that as much magnetic flux as possible is coupled from the inertial element 26 to the sensor-torquer coils 42 through the outer portion 40 of the rotating housing 32, the outer portion 40 is composed of a material that has a low hysteresis loss and a low eddy current loss. The portion 40 would thus be of a non-magnetic and non-conductive material such as a ceramic (aluminum oxide), a plastic, a silica or a silicone glass. In addition, the sides 33 of the rotating housing 32 are held, by means of the ferrite ring 38, at the same magnetic potential as the inertial element 26 in order to prevent vibrationally induced damping of the inertial element 26 because of possible flux coupling thereof to non-vibrating portions of the vibrating rotor gyroscope 10. Since the sides 33 and the inertial element 26 are at the same magnetic potential, there is no flux linkage between them, but merely between the sides 33 and the above-stated portions. Since it is desirable that the same magnetic potential be maintained the entire length of the sides 33, the sides 33 are composed of a material having a small drop in magnetomotive force (MMF) along its length, such as a ferromagnetic material. One of the sides of the rotating housing 32 includes a ceramic ring 35 which serves to prevent a circulating current being developed from the relative motions of the pole cap 36 and the housing 32.

The magnetic flux continues from the coil 42 to a ferrite support member 44 (serving the same function as ferrite ring 38) and back to the magnet 34 via the casing 11 and the support member 12. Thus a permanent closed magnetic flux path having the inertial element 26 as an integral part thereof is maintained in the present invention as part of the sensor-torquer arrangement. While in the preferred embodiment the magnet 34 is held stationary on the bearing 22, it should be realized that the magnet 34 may be made integral with the journal 20 or with the inertial element 26. It should be noted, moreover, that the rotating housing 32 (along with the portion 40 thereof) serves to maintain the inertial element 26 in a vacuum in the presence of the gas spin bearing, while the portion 40 enables the coils 42 to be placed outside the rotating housing 32.

In FIGURES 3 and 4 the various magnetic fields and voltages present during the operation of the vibrating rotor gyroscope are illustrated. The main magnetic field produced by the permanent magnet 34 is illustrated by the arrows tracing the flux path 46. The vibrational motion of the inertial element 26 (and hence the main magnetic field), illustrated by arrow 56, causes a voltage, indicated by arrows 52, to be generated in the sensor-torquer coils 42 of the vibrating rotor gyroscope. As illustrated in FIGURE 4, the voltage induced by the vibrating motion of the inertial element 26 is in an opposite direction in each of the series connected coils of the sensor-torquer coils 42; since, however, the sensor-torquer coils 42 are series connected, as shown in FIGURE 4a, the oppositely directed voltages add to give a combined sensor signal on terminal 60. In a like fashion, a voltage is induced at terminals 60′ by the motion of the inertial element 26 with respect to the sensor-torquer coils 42′. Since both the direction of the main magnetic field through the sensor-torquer coils 42′ and the direction of motion of the inertial element 26 with respect to the sensor-torquer coils 42′ is opposite to the direction of the field and the motion of the inertial element 26 with respect to sensor-torquer coils 42, the voltage appearing on terminals 60' is in phase with the voltage appearing on terminal 60 and may be simply added thereto for a combined sensor signal.

As described previously, the inertial element 26 is subject to longitudinal and transverse vibrations, i.e. to motions parallel and perpendicular to the spin shaft 20. As is evident from FIGURE 4, the unique design of the sensor-torquer coils 42 makes them insensitive to such transverse vibrations. When the inertial element 26 moves in the direction indicated by arrow 58, a flux linkage increase or decrease occurs through the sensor-torquer coils 42 because of the changing gap between the inertial elements 26 and the sensor-torquer coils 42. This change in flux linkage induces voltages in the sensor-torquer coils 42 whose direction, indicated by the arrows 54, is the same in both of the coils. Since the sensor-torquer coils 42 are series connected, the induced voltages buck one another and thereby present a zero net output on terminals 60; similarly, a zero net output is presented on terminals 60'. If the inertial element 26 is vibrating in a longitudinal direction indicated by arrow 57, then all portions of the inertial element 26 are going in the same direction with respect to the sensor-torquer coils 42 and 42'. Thus a voltage is induced in coils 42 and 42' presented on terminals 60 which is of opposite polarity from that induced in coils 42' and presented on terminals 60'. This is in contrast with the normal vibrational motion of the inertial element 26 in which the inertial element 26 is moving in one direction with respect to the sensor-torquer coils 42 and in another direction with respect to the sensor-torquer coils 42'. Thus, in the present invention, while the addition of sensor signals from the terminals 60 and 60' give a combined sensor signal for the normal vibrational motion of the inertial element 26, any signals induced on terminals 60 and 60' by the longitudinal motion of the inertial element 26 are cancelled out (as shown in FIGURE 4a).

As stated previously, the coils 42 and 42' are also used to apply torquing forces to the inertial element 26; in addition, in order to apply torquing forces along orthogonal axes fixed in the case 11, a separate pair of torquer coils 43, 43' displaced 90° from the coils 42 and 42' are provided. The method of torquing is more easily described with reference to FIGURE 3. A current applied to the terminals 60 and 60' causes magnetic fields to be generated by the coils 42 and 42', the direction and flux path of such magnetic fields being indicated by the lines 48 and 50. While the main magnetic field produced by the permanent magnet 34 (indicated by path 46) is in opposite directions in the upper portion and the lower portion of the inertial element 26, the fields produced by the current in coils 42 and 42' are in the same direction in both the upper portion and the lower portion of the inertial element 26. Thus the interaction of the main field and the field produced by the coils 42 and 42' produce opposite effects on the upper portion and the lower portion of the inertial element 26. Since, however, the upper portion and the lower portion of the inertial element 26 are, in the normal vibrational mode, moving in opposite directions, such magnetic interaction provides a cooperative torque on the upper portion and the lower portion of the inertial element 26. For example, if the upper portion of the inertial element 26 were moving to the left, the left coil of coils 42 would produce a magnetic field tending to attract the inertial element 26 to the left while the right coil of coils 42 would produce a magnetic field tending to repel the inertial element 26 to the left; since the lower portion of the inertial element 26 would be moving to the right, the right coil of coils 42' would produce a magnetic field tending to attract the inertial element 26 to the right while the left coil of coils 42' would produce a magnetic field tending to repel the inertial element 16 to the right. The net effect of both such coils 42 and 42' would be to produce a resultant counterclockwise torque on the inertial element 26.

As stated previously, the sensor-torquer coils 42 and 42' are used for both sensing the motion of and torquing the inertial element 26. Circuitry for accomplishing such a function is illustrated in FIGURE 4a. The torquing signal for torquing the inertial element 26 is applied at terminal 70 and is fed through a D.C. amplifier 72 to the series connected coils 42 and 42', the current through the coils 42, 42' producing torquing fields on the inertial element 26 as described in the previous paragraph. At the same time, sensor signals are generated by the vibratory motion of the inertial element 26 and presented on terminals 60 and 60'. Since the inertial element 26 is not only vibrating but also rotating, the frequency of the sensor signals generated by the inertial element 26 is a function of both such motions and is primarily equal to the sum of the frequency of rotation and the frequency of vibration (a small difference frequency term also being present). Thus in the sensor arrangement of the present embodiment, the sensor signals have (in the ideal case) a frequency of 2 N as the frequency of shaft rotation (N) and the natural frequency vibration of the inertial element 26 are equal. In one design, for example, the frequency of shaft rotation is equal to 375 c.p.s. and, therefore, the sensor signals have a ferquency of 750 c.p.s. The sensor signals are then passed through a filter 74 which serves to block out any D.C. torquing signals applied at terminal 70, filter 74 being either a narrow band filter designed to pass only a 750 c.p.s. frequency or a blocking filter such as a capacitor. The sensor signals are coupled to differential amplifier 76 and are presented on terminal 78.

In order to resolve the sensor signals from the coils 42, 42' (presented on terminal 78) into components along a set of orthogonal axes fixed in the outer case 11 (to determine the direction of the angular displacement of the spin shaft 20 relative to such axes), a timing signal having a frequency 2 N is generated. A C-shaped timing generator 80 is affixed to the outer case 11 by supporting member 12 and comprises a C-shaped permanent magnet 81 with a sensing coil (and output lead) 82 wound thereon. A rotating ferrite member 84 (which forms part of the closed-flux path) is constructed with a very slight ellipsoidal conformation so as to vary the reluctance of the magnetic path between the legs of the C-shaped timing generator 80. Since the C-shaped generator 80 is stationary, the position of the rotating member 84 over the two legs of the magnet 81 oscillates radially during each revolution of the spin shaft 20. For each revolution of the shaft 20, the radial oscillation of the member 84 causes it to assume maximum and minimum spacings from the timing generator 80 twice during each revolution. Thus, during each revolution of the spin shaft 20 alternate minimum reluctance and maximum reluctance paths are twice formed between the two legs of the C-shaped timing generator 80. Since the reluctance of the magnetic path varies through two maximums and two minimums each revolution, an A.C. electromotive force is generated in the sensing coil (and output lead) 82 having a frequency twice that of the frequency of revolution of the spin shaft 20. This A.C. electromotive force is used to provide a timing signal of frequency 2 N. As explained in the aforementioned patent application, the timing signal may be applied to a phase shifter to yield two timing signals 90° shifted in phase from one another which, in turn, are combined with the sensor signals from the sensor arrangement in standard demodulators to provide signals representing the magnitudes of the components of angular displacement of the spin shaft 20 along orthogonal axes affixed in the outer case. In an alternative embodiment, a second timing generator may be employed displaced 45° circumferentially from timing generator 80 to provide the second signal shifted in phase 90°.

Having described the invention, it is obvious that numerous modifications and departures may be made by those skilled in the art. For example, the sensor-torquer coils 42 and 42' may be attached to the outside of the rotating housing 32 if a rotor-referenced arrangement such as described in the above-cited patent application is desired. In addition, a single coil may be used for sensing if the transverse and longitudinal motions of the inertial element 26 do not seriously affect the sensor signal, while a single coil may be used for torquing the rotor-referenced arrangement. The permanent magnet 34 may also be replaced by a source capable of producing intermittent magnetic flux such as a electromagnet. Thus, the invention is to be construed as being limited only by the spirit and scope of the appended claims.

What is claimed is:

1. A sensor arrangement for use in a vibrating rotor gyroscope having an inertial element therein rotatable about a first axis comprising: means for generating a magnetic field; sensor means coupled to the magnetic flux of said magnetic field and responsive to variations in said coupled magnetic flux for generating signals representative of the motion of said inertial element; and means for coupling said magnetic flux to said sensor means, said means including said rotatable inertial element.

2. The sensor arrangement of claim 1 wherein said magnetic flux extends through said inertial element substantially orthogonal to said first axis.

3. The sensor arrangement of claim 1 wherein said means for generating said magnetic field is stationary relative to said rotatable inertial element.

4. An inertial instrument comprising: a frame; an inertial element rotatable with respect to said frame about a first axis, said inertial element being capable of vibratory motion about a second axis angularly disposed with respect to said first axis; means for rotating said inertial element about said first axis; sensor means responsive to the vibratory motion of said inertial element for generating signals representative of said vibratory motion; and means for enclosing said inertial element, at least a portion of said means being generally transparent to magnetic flux.

5. The inertial instrument of claim 4 wherein said portion of said enclosing means is composed of a generally non-conducting, non-magnetic material.

6. The inertial instrument of claim 4 wherein said portion of said enclosing means is composed of a ceramic material.

7. An inertial instrument comprising: a frame; an inertial element rotatable with respect to said frame about a first axis, said inertial element being capable of vibratory motion about a second axis angularly disposed with respect to said first axis; means for rotating said inertial element about said first axis; and sensor means responsive to motions of said inertial element for generating signals representative of said motions, said sensor means including means for generating a magnetic field extending through said inertial element in a direction substantially orthogonal to said first axis.

8. The inertial instrument of claim 7 wherein said sensor means includes one or more conductors in close proximity to said inertial element and positioned in the magnetic flux path of said magnetic field, said conductors having a voltage generated therein by said motions of said inertial element.

9. The inertial instrument of claim 7 wherein said sensor means includes one or more pairs of adjacent series-connected coils in close proximity to said internal element and positioned in the magnetic flux path of said magnetic field.

10. The inertial instrument of claim 9 wherein at least two of said pairs of adjacent series-connected coils are substantially 180° removed from and series-connected to one another.

11. The inertial instrument of claim 9 wherein the surface containing said coils is substantially normal to the direction of said magnetic flux.

12. An inertial instrument comprising: a rotatable shaft; an inertial ring torsionally coupled to said shaft, said inertial ring being capable of vibratory motion about an axis substantially orthogonal to said shaft; means for rotating said shaft; and sensor means responsive to motions of said inertial element for generating signals representative of said motions, said sensor means including means for generating a magnetic field and for establishing a magnetic flux path extending radially outwards through said inertial ring and one or more conductors positioned adjacent the edge of said inertial ring and lying in said magnetic flux path, said conductors having voltages generated therein by the vibratory motions of said flux-carrying inertial ring.

13. The inertial instrument of claim 12 wherein said conductors comprise one or more pairs of series-connected coils lying in a surface substantially parallel to the edge of said inertial ring.

14. The inertial instrument of claim 12 further comprising a rotating housing surrounding said inertial ring and having a portion thereof lying between said inertial ring and said conductors, the portion of said rotating housing lying between said inertial ring and said conductors being composed of a material generally transparent to magnetic flux.

15. An inertial instrument comprising: a frame; an inertial element rotatable with respect to said frame about a first axis, said inertial element being capable of vibratory motion about a second axis angularly disposed with respect to said first axis; means for rotating said inertial element about said first axis; sensor means responsive to the vibratory motion of said inertial element for generating signals representative of said vibratory motion; and means surrounding said inertial element for magnetically isolating said inertial element from preselected portions of said inertial instrument, at least a portion of said means being at substantially the same magnetic potential as said inertial element.

16. The inertial instrument of claim 15 wherein said inertial element and said enclosing means are generally of an annular shape and the side portions of said enclosing means are at substantially the same magnetic potential as said inertial element.

17. The inertial instrument of claim 15 wherein said portions of said enclosing means are composed of a material having a small loss in magnetomotive force along its length.

18. The inertial instrument of claim 17 wherein said portions are composed of a ferromagnetic material.

19. A sensor arrangement for use in a vibrating rotor gyroscope having an inertial element therein rotatable about a first axis comprising: means for generating a magnetic field; sensor means positioned adjacent the outside periphery of said inertial element and coupled to the magnetic flux of said magnetic field, said sensor means being responsive to variations in said coupled magnetic flux for generating signals representative of the motion of said inertial element; and means for coupling said magnetic flux to said sensor means, said means including said rotatable inertial element.

20. An inertial instrument comprising: a frame; an inertial element rotatable with respect to said frame about a first axis, said inertial element being capable of vibratory motion about a second axis angularly disposed with respect to said first axis; means for rotating said inertial element about said first axis; means for generating a magnetic field and for establishing a magnetic flux path extending outwardly through said inertial element; sensor means coupled to the magnetic flux of said magnetic field and responsive to the vibratory motion of said inertial element for generating signals representative of said vibratory motion; and means for enclosing said inertial element, at least a portion of said means being generally transparent to the magnetic flux of said magnetic field.

21. An inertial instrument comprising: a frame; an inertial element rotatable with respect to said frame about a first axis, said inertial element being capable of vibratory motion about a second axis angularly disposed with respect to said first axis; means for rotating said inertial element about said first axis; and sensor means responsive to motions of said inertial element for generating signals representative of said motions, said sensor means having a portion thereof positioned adjacent the outside periphery of said inertial element and including means for generating a magnetic field extending through said inertial element in a direction substantially orthogonal to said first axis.

References Cited

UNITED STATES PATENTS

| | | | |
|---|---|---|---|
| 2,719,291 | 9/1955 | Wing | 74—5 |
| 2,995,938 | 8/1961 | Brodersen et al. | 74—5 |
| 3,176,523 | 4/1965 | Amlie et al. | 74—5.6 |
| 3,226,984 | 1/1966 | Humphrey | 74—5.6 |
| 3,260,122 | 7/1966 | Rocks | 74—5.6 |
| 3,301,073 | 1/1967 | Howe | 74—5.7 |

C. J. HUSAR, *Primary Examiner.*